Feb. 23, 1932. G. H. EARMAN 1,846,478
MEANS FOR REMOVING OBJECTIONABLE ODORS AND FLAVORS FROM MILK
Filed Aug. 11, 1930
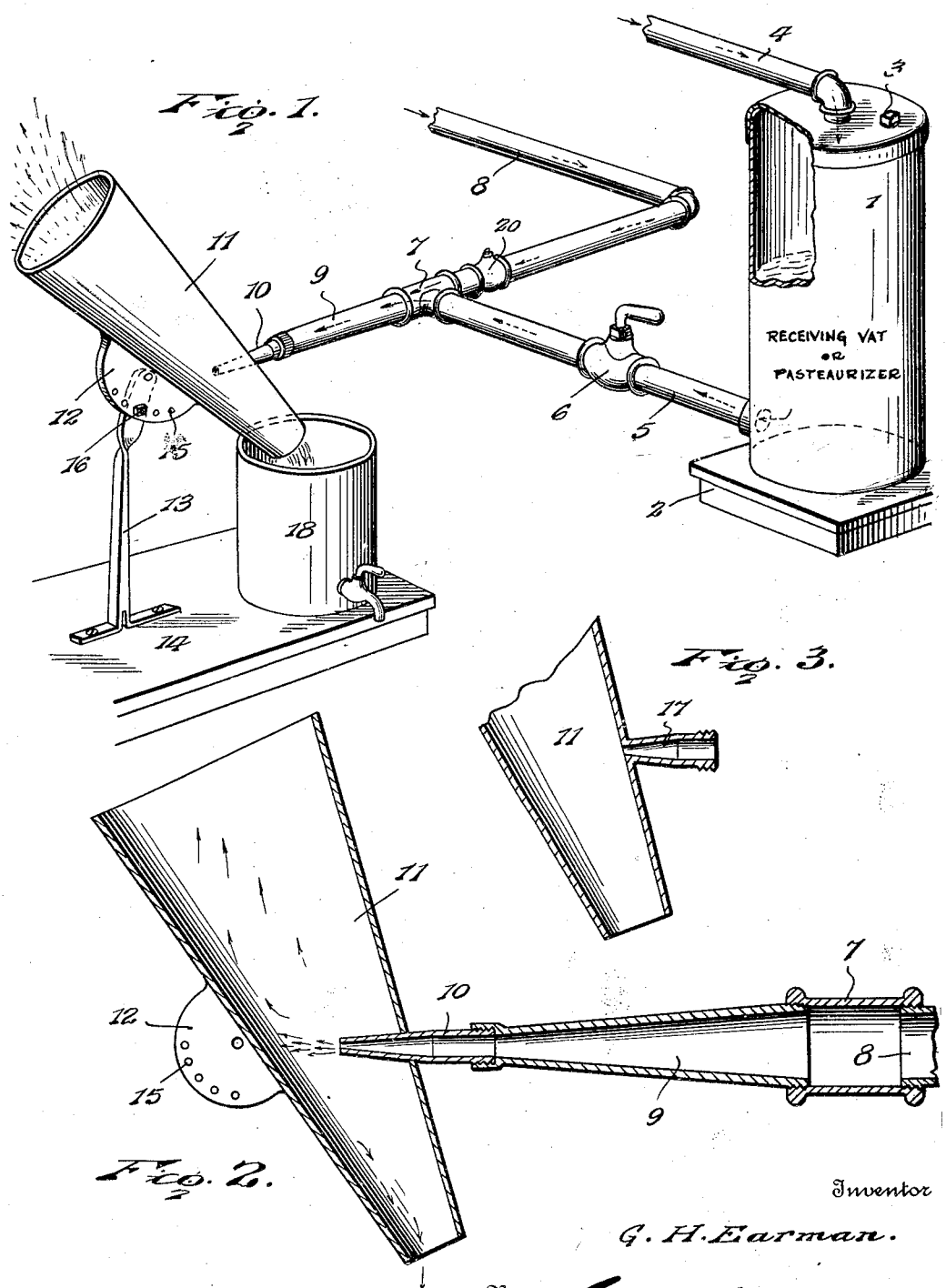

Patented Feb. 23, 1932

1,846,478

UNITED STATES PATENT OFFICE

GEORGE H. EARMAN, OF HARRISONBURG, VIRGINIA, ASSIGNOR TO NATHANIEL H. KEEZELL, OF KEEZLETOWN, VIRGINIA, TRUSTEE

MEANS FOR REMOVING OBJECTIONABLE ODORS AND FLAVORS FROM MILK

Application filed August 11, 1930. Serial No. 474,639.

This invention has for its object the provision of very simple, inexpensive and efficient means whereby disagreeable and objectionable odors and flavors may be eliminated from milk and cream. It is well known that in certain sections and at certain seasons milk and cream contain the odor and flavor of garlic and onion which odor and flavor are carried into butter produced from such cream and are very disagreeable and objectionable to many people. The present invention provides means whereby the odors and flavors may be very quickly and easily removed from the milk and cream so that they will be rendered palatable and no disagreeable taste will be present in butter produced therefrom. The invention is illustrated in the accompanying drawings and will be hereinafter fully set forth.

In the drawings:

Figure 1 is a perspective view, partly broken away, of an apparatus embodying the invention.

Figure 2 is an enlarged detail section of a portion of the apparatus, and

Figure 3 is a detail view similar to Figure 2 and showing a slight variation.

In the drawings, the reference numeral 1 indicates a receiving vat or container which may be supported upon a table or bench or other convenient object, indicated at 2, and which is provided in its upper end with a filling plug 3 to permit the placing of the milk and cream therein. As indicated, the vat is preferably provided with a removable cover to facilitate cleaning. Leading into the top of the vat or container is a pipe 4 which is connected with a source of compressed air which may be an ordinary fan or blower and which is not illustrated as, in itself, it forms no part of the present invention. Leading from the bottom of the container is a pipe 5 equipped with a regulating valve 6 and having its outer end coupled into a T-fitting 7, one end or side of said fitting being connected to a pipe 8 leading from a source of compressed air and the opposite end of said fitting being connected to a pipe 9 through which the milk and cream from the vat and the fluid admitted through the pipe 8 may pass. A check valve, indicated at 20, is placed in the pipe 8 adjacent the fitting 7 to prevent milk running into the compressor when the power stops. The pipe 9 is preferably tapered from the fitting 7 to its discharge end, as shown most clearly in Fig. 2, whereby the fluid flowing therethrough will be subjected to a gradually increasing pressure and will issue therefrom with considerable speed. The tapered discharge pipe 9 in the form shown in Figs. 1 and 2 is threaded onto the outer end of a nozzle 10 which extends through and fits closely in an opening in one side of an aspirator 11 in the form of an inverted truncated cone having both ends open. This aspirator is formed with or has rigidly secured thereto a plate 12 which is preferably arcuate and is pivotally secured to a post 13 secured upon and rising from a table or other support, indicated at 14, the plate 12 being provided adjacent its margin with a series of openings 15, through any one of which and a corresponding opening in the upper end portion of the post 13, a securing bolt, indicated at 16, may be passed to secure the aspirator in a desired inclined position. The nozzle 10 may be brazed or otherwise secured in or intimately united with the aspirator or it may be formed integral therewith, as shown at 17 in Fig. 3. A receptacle 18 is placed below the lower end of the aspirator to receive the treated milk and cream which discharge therefrom.

In the use of the described apparatus, the valve 6 is closed and the milk and cream to be treated are placed in the container 1 and the filling opening then closed, the container not being entirely filled but having a portion of its interior left empty, as indicated in Fig. 1. The milk and cream may be pasteurized before delivery into the container or vat 1 or it may be pasteurized in said container. If the liquid should be sour, it may be standardized to a desired degree of acidity by placing therein a suitable quantity of lime hydrate, or soda bicarbonate or other neutralizing agent, and it should be pasteurized at a temperature of from 180 to 185 degrees F. After being pasteurized or being placed in the vat or container 1, the liquid should be reduced in temperature so that it will pass through the illustrated apparatus at a temperature of from 135 to 150 degrees F. The liquid having been reduced to the desired temperature, compressed air is admitted to the top of the container and when sufficient pressure has been attained within the container the valve 6 is opened so that the compressed air will drive the fluid from the vat through the pipe 5 and past the valve 6. At the same time compressed air, to which steam may be added if preferred or desired, is admitted through the pipe 8 and this compressed air will flow with considerable velocity through the fitting or coupling 7 so as to mingle with the liquid flowing through the pipe 5 to aerate the same and create a suction which will aid in causing a rapid outflow from the container. The commingled liquid and air will issue from the nozzle 10 or 17 with considerable force and will impinge against the far wall of the aspirator 11, the air or commingled air and steam being deflected upwardly and caused to issue from the upper larger end of the aspirator while the heavier particles of milk and cream will gravitate to and through the lower end of the same and accumulate in the receptacle 18. The milk and cream being obviously heavier than the air with which it is commingled, a ready separation of the liquid and the gaseous matter will be effected within the aspirator and the matters which impart the disagreeable odors and flavors to the liquid will be carried out with the gaseous content. The upward outflow of the gaseous content will create a strong suction upwardly through the aspirator so that air from below the same will be drawn therethrough and this air, meeting the descending liquid, will complete the cooling of the same as well as the separation and carrying off of the obnoxious matters.

The apparatus is exceedingly simple and does not require a return circulation of the liquid to be treated. I have found that from six to nine cubic feet of air will treat one gallon of cream so as to thoroughly remove all of the disagreeable odors and flavors within a very few minutes and without requiring any portion of the liquid to be passed through the apparatus a second time.

Having thus described the invention, I claim:

1. In apparatus for the purpose set forth, a container for liquid to be treated, an outlet pipe leading therefrom, means for delivering fluid under pressure into the top of the container, a fluid pressure pipe intersecting and communicating with the outlet pipe, a nozzle connected with said fluid pressure pipe, and an inclined aspirator having both ends open and having its lower end smaller than its upper end and into which the nozzle discharges.

2. In apparatus for the purpose set forth, a container for liquid to be treated, means for delivering fluid under pressure into the top of the container, an outlet from the bottom of the container, an adjustably tilted aspirator having both ends open and larger at its upper end than at its lower end, a fluid pressure conductor communicating with and passing across the liquid outlet, a tapered outlet for said fluid pressure conductor, and a nozzle connected to said outlet and leading into the aspirator between the ends of the same.

3. In apparatus for the purpose set forth, means for applying air under pressure to a liquid to be treated and causing flow of the liquid, a pipe to which said liquid is delivered and which receives fluid under pressure to commingle with and aerate the liquid, a tilted aspirator having both ends open, and a nozzle connected with said fluid pressure pipe and entering the aspirator between the ends thereof.

In testimony whereof I affix my signature.

GEORGE H. EARMAN. [L. S.]